US010513810B2

(12) United States Patent
Ramachandran et al.

(10) Patent No.: US 10,513,810 B2
(45) Date of Patent: Dec. 24, 2019

(54) METHOD OF PRODUCING A CONTINUOUS FIBRE REINFORCEMENT LAYER FROM INDIVIDUAL FIBRE MATS

(71) Applicant: LM WP PATENT HOLDING A/S, Kolding (DK)

(72) Inventors: Dhinagaran Ramachandran, Bangalore (IN); Shalu Thadathazhath, Kerala (IN); Sathiyagopi Madurai, Karnataka (IN); Rohin Sushil, Karnataka (IN); Rajesh Aithal, Karnataka (IN); Hannah Priyadarshini B, Karnataka (IN); Mohammad Imdad Basha, Karnataka (IN); Christian Lundsgaard-Larsen, Kolding (DK); Rasmus C Østergaard, København (DK); Torben Krogsdal Jacobsen, Lunderskov (DK)

(73) Assignee: LM WP PATENT HOLDING A/S, Kolding (DK)

(*) Notice: Subject to any disclaimer, the term of this patent is extended or adjusted under 35 U.S.C. 154(b) by 308 days.

(21) Appl. No.: 15/318,398

(22) PCT Filed: Jun. 16, 2014

(86) PCT No.: PCT/EP2014/062526
§ 371 (c)(1),
(2) Date: Dec. 13, 2016

(87) PCT Pub. No.: WO2015/192867
PCT Pub. Date: Dec. 23, 2015

(65) Prior Publication Data
US 2017/0121877 A1    May 4, 2017

(51) Int. Cl.
*D04H 3/04*    (2012.01)
*F03D 1/06*    (2006.01)
(Continued)

(52) U.S. Cl.
CPC .............. *D04H 3/04* (2013.01); *B29C 65/481* (2013.01); *B29C 65/72* (2013.01);
(Continued)

(58) Field of Classification Search
CPC . B32B 7/02; F01D 5/282; B23P 15/04; F03D 1/06; B03D 3/06; B29C 70/06
See application file for complete search history.

(56) References Cited

U.S. PATENT DOCUMENTS 1,523,999 A * 1/1925 Hathaway ................. D03J 1/16
                                                    28/209
3,367,813 A * 2/1968 Holfeld .................. B65H 69/02
                                                    156/158

(Continued)

FOREIGN PATENT DOCUMENTS

EP    2 033 769 A1    3/2009
EP    2 330 292 A2    6/2011
EP    2 716 434 A1    4/2014

OTHER PUBLICATIONS

International Search Report dated Feb. 19, 2015 issued in corresponding International Application No. PCT/EP2014/062526.

*Primary Examiner* — Jeffry H Aftergut
*Assistant Examiner* — Jaeyun Lee
(74) *Attorney, Agent, or Firm* — Nath, Goldberg & Meyer; Jerald L. Meyer; Tanya E. Harkins

(57) ABSTRACT

A method of producing a single assembled longitudinally extending fibre layer for use in a later resin infusion process for manufacturing a fibre-reinforced composite structure is described including steps: a) providing a first fibre mat comprising unidirectional reinforcement fibres oriented in a longitudinal direction of the first fibre mat, b) providing a second fibre mat comprising unidirectional reinforcement fibres oriented in a longitudinal direction of the second fibre mat, c) arranging the first fibre mat and the second fibre mat
(Continued)

so that unidirectional fibres of one end of the first fibre mat adjoin one end of the second fibre mat in a single plane at a common boundary, and d) splicing unidirectional fibres of the first fibre mat at one end of the first fibre mat to unidirectional fibres of the second fibre mat at one end of the second fibre mat in order to form a splicing joint.

19 Claims, 6 Drawing Sheets

(51) Int. Cl.
 *B29D 99/00* (2010.01)
 *B29C 65/48* (2006.01)
 *B29C 65/72* (2006.01)
(52) U.S. Cl.
 CPC ....... *B29D 99/0025* (2013.01); *F03D 1/0675* (2013.01); *B29K 2313/00* (2013.01); *F05B 2220/30* (2013.01); *F05B 2230/23* (2013.01); *F05B 2230/60* (2013.01); *F05B 2240/21* (2013.01); *F05B 2280/6003* (2013.01)

(56) References Cited

U.S. PATENT DOCUMENTS

| | | | |
|---|---|---|---|
| 3,885,071 A | 5/1975 | Blad | |
| 4,328,066 A * | 5/1982 | Kiuchi | ................ B29C 69/005 156/157 |
| 5,266,139 A * | 11/1993 | Yokota | ................ B29C 53/8041 156/158 |
| 7,364,407 B2 * | 4/2008 | Grabau | ................ F03D 1/065 416/229 R |
| 2003/0127177 A1 | 7/2003 | Lane | |
| 2006/0083907 A1 * | 4/2006 | Bech | ................ B29C 66/1162 428/212 |

* cited by examiner

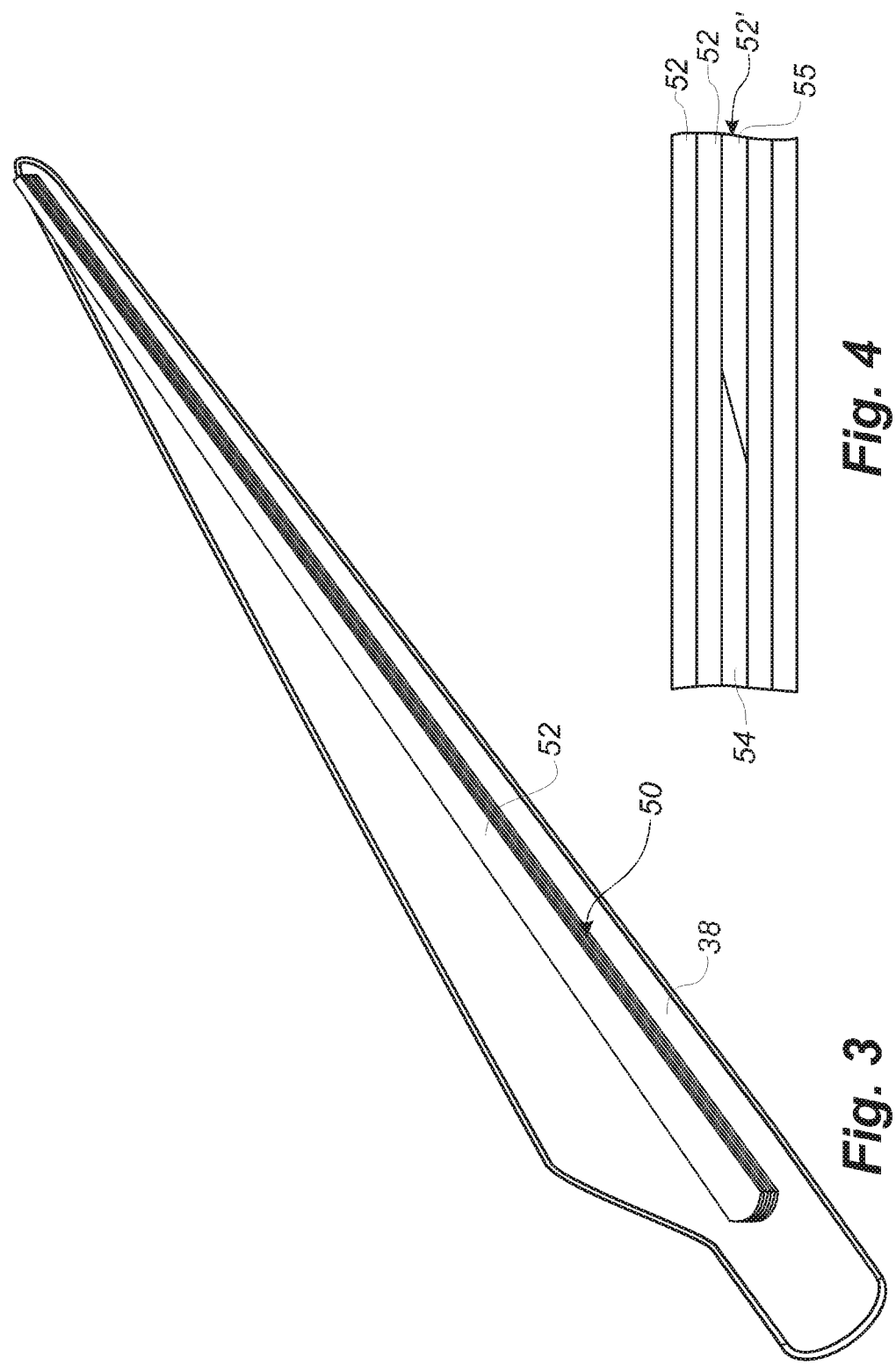

METHOD OF PRODUCING A CONTINUOUS FIBRE REINFORCEMENT LAYER FROM INDIVIDUAL FIBRE MATS

This is a National Phase Application filed under 35 U.S.C. 371 as a national stage of PCT/EP2014/062526, filed Jun. 16, 2014, the content of each of which is hereby incorporated by reference in its entirety.

TECHNICAL FIELD

The present invention relates to a method of producing a single assembled longitudinally extending fibre layer for use in a later resin infusion process for manufacturing a fibre-reinforced composite structure. The invention additionally relates to a method of manufacturing a wind turbine blade part via at least one such assembled fibre layer. The invention further relates to an assembled longitudinally extending fibre reinforcement layer for use in a later resin infusion process for manufacturing a fibre-reinforced composite structure.

BACKGROUND

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or vacuum assisted resin transfer moulding (VARTM) is one method, which is typically employed for manufacturing composite structures, such as wind turbine blades comprising a fibre reinforced matrix material.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

In most cases the polymer or resin applied is polyester, vinyl ester or epoxy, but may also be polyurethane (PUR) or polydicyclopentadiene (pDCPD), and the fibre reinforcement is most often based on glass fibres or carbon fibres. Epoxies have advantages with respect to various properties, such as shrinkage during curing (which in some circumstances may lead to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 70 meters long, the amount of fibre reinforcement material has also increased. When manufacturing blades with a spar cap, fibre mats comprising unidirectional fibres are laid out as layers along the full length of the main laminate in order to provide stiffness to the main laminate. The fibre mats are typically applied from a roll and are cut to the desired length. Many of the glass fibre reinforced blades utilise H-glass. While ply joints comprising ply drops are allowed for E-glass, such ply joints are not allowed for H-glass, since an overlapping joint results in unacceptable wrinkles and therefore reduces strength. This in effect means that if the fibre mat roll ends at a length that is shorter than the main laminate, this end piece has to be discarded and a new roll is started. As an example, if an H-glass roll ends at 25 metres from the root for a 47.6 metre blade, the 25 metres of H-glass will have to be scrapped. The resulting waste of excess fibre-reinforcement material is significant.

However, even for E-glass the use of the end piece from the fibre mat roll may entail problems, since studies have indicated that internal ply overlaps have a 32% drop in strength at the overlap. Further, wrinkles are often observed in such overlaps. Such wrinkles lead to variations in the stiffness and mechanical weak points in the wind turbine blade.

DISCLOSURE OF THE INVENTION

It is an object of the invention to provide a new method for manufacturing parts for wind turbine blades and intermediary products, and which overcomes or ameliorates at least one of the disadvantages of the prior art or which provides a useful alternative.

According to a first aspect, the invention provides a method of producing a single assembled longitudinally extending fibre layer for use in a later resin infusion process for manufacturing a fibre-reinforced composite structure, the method comprising the following steps:
a) providing a first fibre mat comprising unidirectional reinforcement fibres oriented in a longitudinal direction of the first fibre mat between two ends,
b) providing a second fibre mat comprising unidirectional reinforcement fibres oriented in a longitudinal direction of the second fibre mat between two ends,
c) arranging the first fibre mat and the second fibre mat so that unidirectional fibres of one end of the first fibre mat adjoin one end of the second fibre mat in a single plane at a common boundary, and
d) splicing unidirectional fibres of the first fibre mat at said one end of the first fibre mat to unidirectional fibres of the second fibre mat at said one end of the second fibre mat in order to form a splicing joint.

This provides a stronger laminate layer in a final composite structure than conventional laminate layers that are manufactured via two or more non-spliced fibre mats prior to the infusion process. Further, it is possible to reduce the number of wrinkles in the laminate, thus decreasing mechanical weaknesses in the final composite structure even further. This is particularly achieved since the splicing joint ensures that the two mats do not move during a layup procedure, e.g. when additional fibre layers are arranged on top of the assembled fibre layers, or when the fibre reinforcement material is later vacuum bagged and infused.

Additionally, this method has the advantage that excess fibre reinforcement mats from e.g. rolls may be utilised for forming a single layer in the final composite structure without compromising the mechanical strength of the composite structure. This may be particular useful for H-glass where joints are normally not allowed. This significantly reduces the amount of waste and lowers manufacturing costs.

The fibre mats are dry fibre mats, i.e. non-impregnated fibre mats. Accordingly, it is seen that the invention relates to the production of a single fibre reinforcement layer comprising a plurality of individual fibre mats and which after the production of the single fibre reinforcement layer is impregnated with a resin, which is subsequently hardened or cured in order to form the composite structure.

The splicing of the fibre mats may be carried out in-mould, i.e. during the layup of the single longitudinal layer, or it may be carried out at a platform resting on the mould, or it may be carried out outside of the mould, e.g. for forming a new roll of fibre-reinforcement material made from excess fibre mats. The splicing of the fibre mats may also be utilised to produce fibre plies having specific lengths. By choosing for instance appropriate excess fibre mats, the position of the joint can also be controlled. The ends of the spliced fibre mat may be cut or trimmed in order to produce a ply of the specific length.

In the following, unidirectional fibres will sometimes be abbreviated as UD fibres.

Splicing in terms of the present invention means that the UD fibres of the first fibre mat are preliminary bonded or otherwise attached to UD fibres of the second fibre mat prior to a later resin infusion process.

The infusion process may for instance be Resin Transfer Moulding (RTM) or Vacuum Assisted Resin Transfer Moulding (VARTM).

It is clear that the first fibre mat and the second fibre mat both comprise a first end and a second end. Thus, the second end of the first fibre mat may be assembled with the first end of the second fibre mat. It is realised that this process may be continued so that the second end of the second fibre mat further may be assembled with the first end of a third fibre mat and so forth. Accordingly, the assembled fibre layer may comprise a plurality of splicing joints comprising spliced UD fibres.

The UD fibres at said one end of the first fibre mat and the UD fibres at said one end of the second fibre mat are preferably arranged so that they overlap each other in the longitudinal direction in a longitudinal zone. This overlap can be provided in various ways. According to a preferred embodiment, said one end of the first fibre layer and said one end of the second fibre layer are cut taperingly, wherein said fibre layers in step c) are arranged so that the common boundary forms a tapering transition between unidirectional fibres of the first fibre mat and unidirectional fibres of the second fibre mat in the longitudinal direction of the single assembled, longitudinally extending fibre layer. This embodiment provides a large splicing boundary and overlap, which provide a particular strong preliminary splicing between the two fibre mats.

Tapering transition advantageously has a thickness-to-length ratio between 1:50 and 1:5, e.g. around 1:30.

In one embodiment, an adhesive or tackifier is utilised for providing said splicing. However, it should be noted that the adhesive is only used in an amount to immobilise the UD fibres at the common boundary and should not form an impermeable region, which would impair the later infusion process.

The adhesive is preferably powder based. The powder based adhesive may for instance be a Neoxil® powder. Such an embodiment has shown to provide a highly advantageous splicing joint without impairing the wetting of the fibres in a later impregnation process.

In a further embodiment, the splicing joint is heated, e.g. through ironing. This may facilitate a preliminary adhesive bonding between the two fibre mats, e.g. by melting a powder based adhesive, and in addition the ironing may provide a frictional bond between the fibre mats. The adhesive bond only provides a preliminary bonding effect and is not provided in an amount that would impair wetting of the assembled fibre layer in the later infusion process.

In another embodiment, step d) comprises the step of stitching the first fibre mat and the second fibre mat together for providing said splicing. Thereby, it is possible to provide a mechanical connection between the UD fibres of the two mats without impairing the wetting of the fibres in the later infusion process.

Stitching and adhesive splicing may be used together or separately.

According to one embodiment, a scrim, such as a glass tape or a strip of chopped strand mat, may further be arranged along the common boundary of the first fibre mat and the second fibre mat. The scrim may be stitched or adhered to the two fibre mats in order to improve the splicing between the fibres. The scrim may for instance be attached at a surface of the assembled layer, e.g. an upper surface. The scrim may for instance be a glass tape or a chopped strand mat.

In yet another embodiment, unidirectional fibres of the first fibre mat are pressed against unidirectional fibres of the second fibre mat in order to form a frictional connection between said unidirectional fibres. Accordingly, the fibres may contact each other and provide a frictional bond or entanglement in order to provide a further splicing between the fibres. The frictional bond may be carried out prior to stitching of the fibre mats.

In a further embodiment, step d) comprises the use of rollers for pressing the unidirectional fibres of the first mat and the second fibre mat against each other. In one embodiment, the rollers are rolled in the transverse direction of the assembled fibre mat, i.e. along the splicing joint. However, in another embodiment, the rollers are rolled in the longitudinal direction. The width of the rollers may correspond to the width of the first fibre mat and the second fibre mat.

The rollers may advantageously comprise a first and a second roller, e.g. an upper roller and a lower roller. The roller may be arranged with a spacing that corresponds to the thickness of the fibre mats. One of the rollers may have a corrugated or grooved surface, which may be used to align the UD fibres, when rolled in the longitudinal direction. The width of the corrugations may correspond to the width of fibre bundles comprising UD fibres of the fibre mats. The rollers may be hollow or pipe shaped. Further, the rollers may be provided with openings or holes in the roller surface. Thereby, it is possible to apply air pressure or suction to the rollers. It is for instance possible to apply air pressure to one roller and suction to the other. This may facilitate a friction bond between the UD fibres of the two mats by forming loose fibre strands, which are tied to each other. The suction may advantageously be applied to the roller with corrugated or grooved surface such that it is ensured that the fibres enter the grooves and are aligned as the rollers are rolled in the longitudinal direction.

In one embodiment, said ends of the first fibre mat and the second fibre mat, respectively, are cut in a direction substantially orthogonal to the longitudinal direction. In another embodiment, said one ends of the first fibre mat and the second fibre mat, respectively, are angled in a direction substantially orthogonal to the longitudinal direction. The angle may for instance form an acute angle of 30-85 degrees to the longitudinal direction. The ends may also be cut in a zig-zag pattern in the transverse direction of the first and the second fibre mats.

In one advantageous embodiment, the unidirectional fibres at said one ends of the first fibre mat and the second fibre mat are unstitched at a longitudinal zone at said one ends prior to step d). In this regard it is noted that UD fibre mats are usually stitched in the transverse direction, e.g. so as to form fibre bundles. However, it is of course recognised that the same may be achieved for non-stitched UD fibre mats. The unstitched unidirectional fibres are then preferably overlapped to form the common boundary and subsequently spliced to each other, preferably so that the two fibre layers are unstitched in the afore-mentioned longitudinal overlap zone prior to step d).

It is clear that the UD fibres do not necessarily form a tapered boundary after step d) in particular if a frictional connection has been provided between the fibres.

In one embodiment, unidirectional fibres at said one ends of the first fibre mat and the second fibre mat are aligned in the longitudinal direction via alignment means, such as a comb. This minimises the wrinkles that often occur at boundaries between two fibre mats and provides a strong stitching bond. Accordingly, any mechanical weaknesses are also minimised in the final composite structure.

The UD fibres of the fibre mats are preferably E-glass, H-glass or carbon fibres.

According to a second aspect, the invention provides a method of manufacturing a wind turbine blade part, such as a blade shell part, wherein the manufacturing method includes layup of fibre layers in a mould, wherein at least one of the fibre layers are produced according to any of the afore-mentioned methods, and wherein a resin is later supplied to said fibre layers and subsequently cured or hardened in order to form a composite structure. The composite structure may for instance be manufactured via a RTM or VARTM procedure.

Accordingly, the invention provides a method of manufacturing a wind turbine blade part made of a fibre reinforced polymer material including a polymer matrix and fibre reinforcement material embedded in the polymer matrix, wherein the method comprises the steps of:
i) providing a forming structure comprising a mould cavity and having a longitudinal direction,
ii) placing a plurality of stacked fibre layers extending in a longitudinal direction of the forming structure,
iii) providing a resin in the mould cavity subsequently to step ii), and
iv) curing or hardening the resin in order to form the composite structure, wherein
at least one said plurality of stacked fibre layers is an assembled fibre layer produced according to the afore-mentioned method.

The plurality of stacked fibre layers preferably comprises UD fibres. The mould is preferably a mould having a negative shape of the final composite structure. The fibre layers are advantageously arranged in a longitudinal direction of the mould. Accordingly, the unidirectional fibres are also aligned in the longitudinal direction.

In one embodiment, the layup involves stacking of a plurality of fibre layers, and wherein said at least one fibre layer is sandwiched between two fibre layers which do not have a splicing joint at the splicing joint of said at least one assembled fibre layer. The two fibre layers are preferably also UD fibre mats.

Thus, it is seen that the method relates to a normal layout procedure, where advantageously continuous layers are arranged in the mould, and only layers comprising spliced fibre mats are used in order to reduce the amount of waste products.

In one embodiment, the wind turbine blade part is a load carrying structure, such as a main laminate or a spar cap. The main laminate or spar cap may be integrated in a blade shell part, or it may be manufactured as a separate part.

According to a third aspect, the invention provides an assembled, longitudinally extending fibre reinforcement layer manufactured according to the afore-mentioned method. Accordingly, the invention provides an assembled longitudinally extending fibre reinforcement layer for use in a later resin infusion process for manufacturing a fibre-reinforced composite structure, the fibre reinforcement layer comprising:
- a first fibre mat comprising unidirectional reinforcement fibres oriented in a longitudinal direction of the first fibre mat between two ends (a first end and a second end),
- a second fibre mat comprising unidirectional reinforcement fibres oriented in a longitudinal direction of the second fibre mat between two ends (a first end and a second end), wherein
- the first fibre mat and the second fibre mat are arranged so that unidirectional fibres of one end of the first fibre mat adjoin one end of the second fibre mat in a single plane at a common boundary, and wherein
- the unidirectional fibres of the first fibre mat at said one end of the first fibre mat are spliced to unidirectional fibres of the second fibre mat at said one end of the second fibre mat and forming a splicing joint.

BRIEF DESCRIPTION OF THE DRAWINGS

The invention is explained in detail below with reference to an embodiment shown in the drawings, in which
FIG. 3 is a schematic perspective view showing the fibre layers of a main laminate,
FIG. 4 is a schematic longitudinal view of fibre layers of the main laminate.

DETAILED DESCRIPTION OF THE INVENTION

Figure 1:
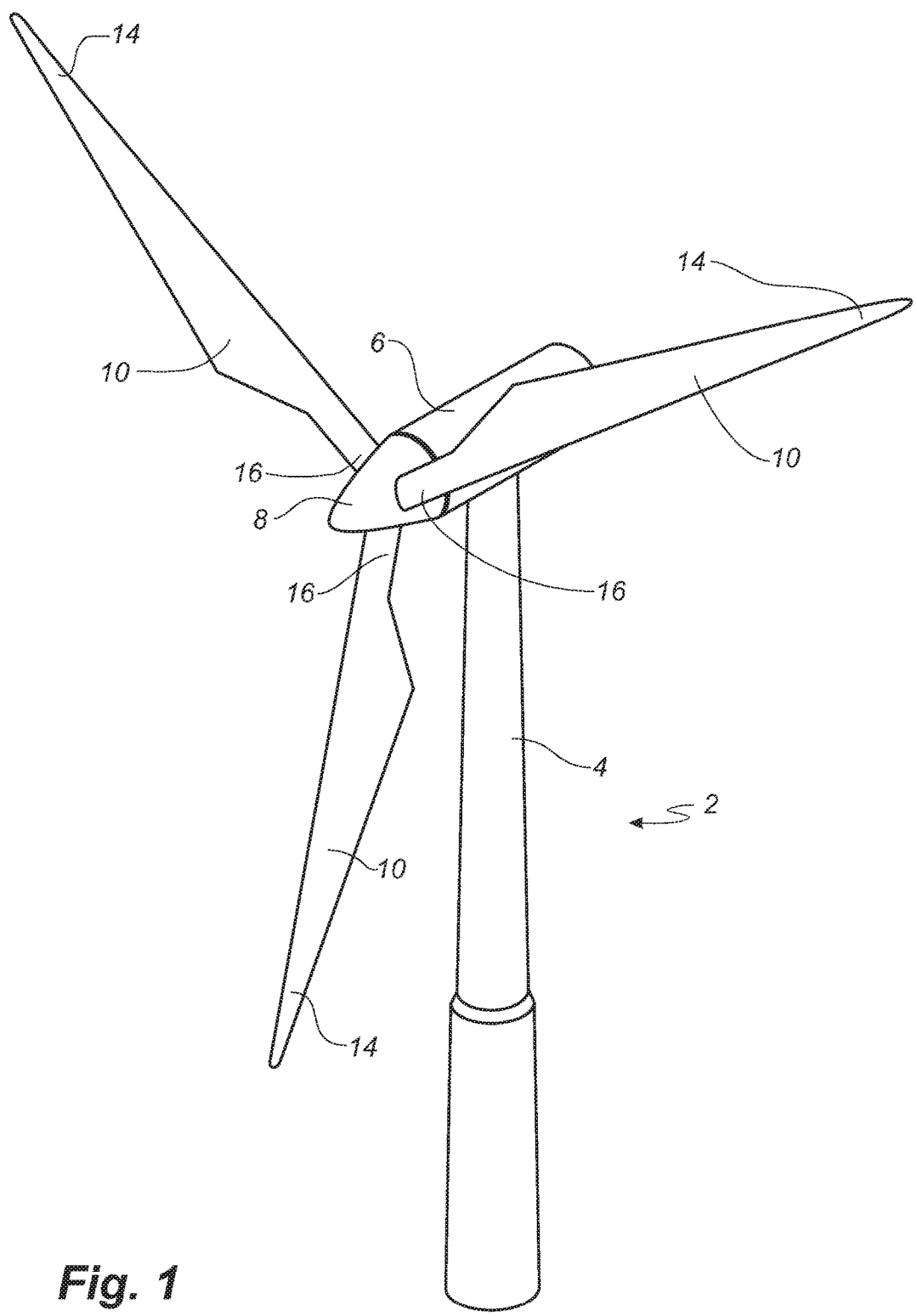
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
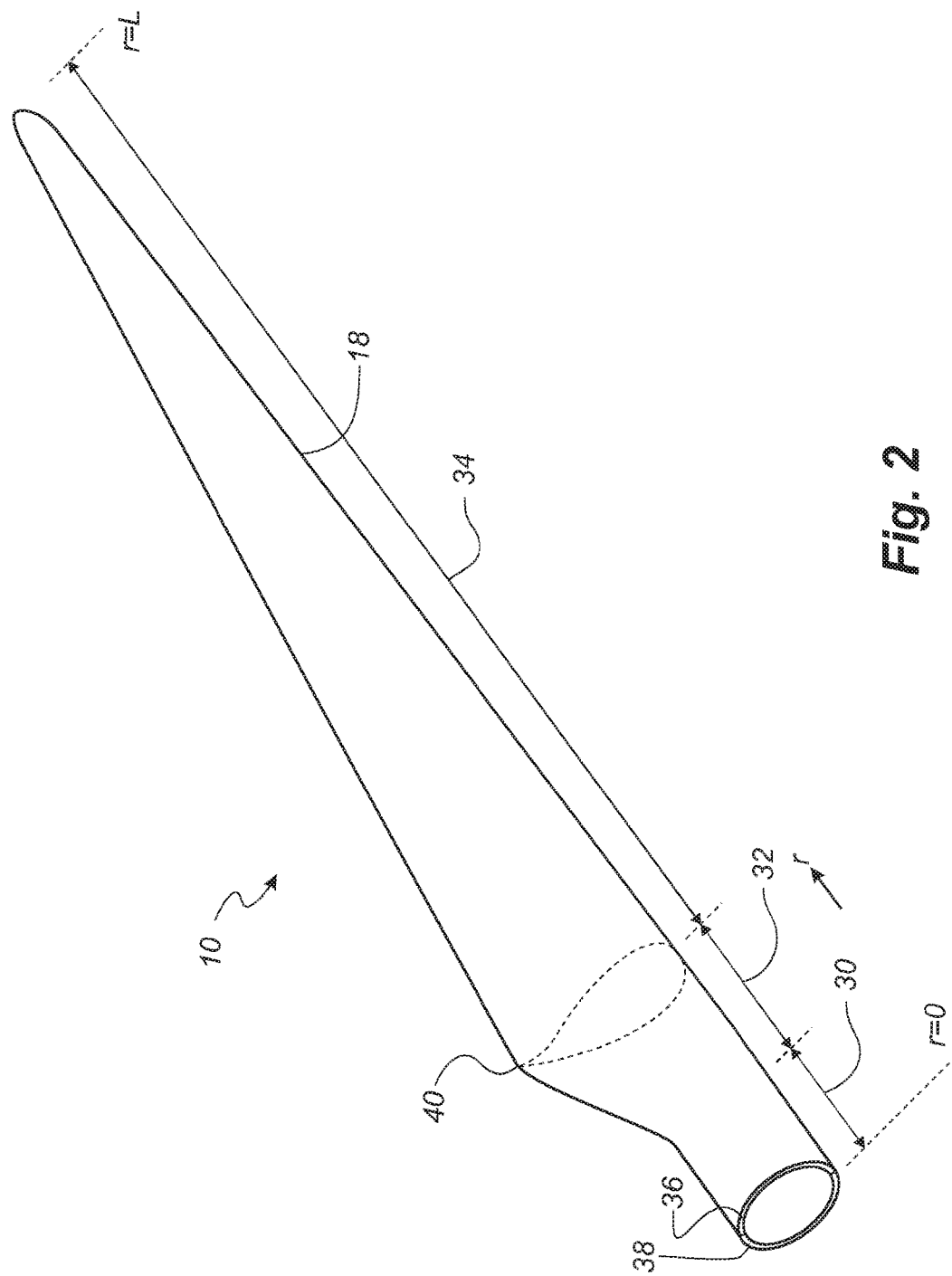
FIG. 2 is a schematic perspective view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

In the following, the invention is explained with respect to the manufacture of the pressure side shell part 36 or suction side shell part 38.

As shown in FIG. 3, the suction side shell part 38 comprises a spar cap or main laminate 50, which extends in the longitudinal direction of the suction side shell part substantially along the entire length of the suction side shell part 38. The main laminate 50 comprises a plurality of fibre layers or mats 52 comprising unidirectional fibres (UD fibres), typically more than twenty fibre layers. The fibre mats are typically applied from a roll in dry form and are cut to the desired length. The fibre layup is then later vacuum bagged and infused with a resin, which is finally cured in order to form a composite structure. Many of the glass fibre reinforced blades utilise H-glass. While ply joints comprising ply drops are allowed for E-glass, such ply joints are not allowed for H-glass. This in effect means that if the fibre mat roll ends at a length that is shorter than the main laminate, this end piece will have to be discarded and a new roll is started. As an example, if an H-glass roll ends at 25 metres from the root for a 47.6 metre blade, the 25 metres of H-glass will have to be scrapped. The resulting waste of excess fibre-reinforcement material is significant.

The present invention as shown in FIG. 4 solves this problem by producing assembled fibre layer 52', which comprises at least a first fibre mat 54 and a second fibre mat 55, where the UD fibres are spliced at ends of the two fibre mats 54, 55 so as to form an assembled fibre layer 52'. The two fibre mats 54, 55 are arranged in a single plane such that the assembled layer 52' forms a single layer without ply drops. This provides a stronger laminate layer in a final composite structure than conventional laminate layers that are manufactured via two or more non-spliced fibre mats prior to the infusion process. Further, it is possible to reduce the number of wrinkles in the laminate, which will decrease mechanical weaknesses in the final composite structure even further. This is particularly achieved since the splicing joint ensures that the two mats do not move during a layup procedure, e.g. when additional fibre layers are arranged on top of the assembled fibre layers, or when the fibre reinforcement material is later vacuum bagged and infused. As seen from FIG. 4, the assembled fibre layer 52' or at least the assembly region is sandwiched between two continuous fibre layers 52, which do not have a splicing at the splicing region of the assembled fibre layer 52'.

Figure 5:
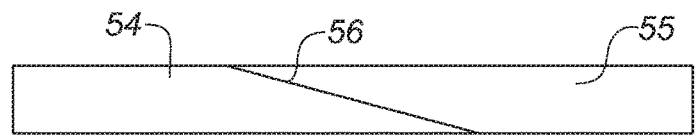
FIG. 5 is a schematic side view of an assembled fibre layer according to the invention.

According to a preferred embodiment shown in FIG. 5, the UD fibres of the first fibre mat 54 and the UD fibres of the second fibre mat 55 are cut taperingly such that the UD fibres of the two fibre mats 54, 55 adjoin each other at a common boundary 56, which forms a tapering transition between the UD fibres of the two mats 54, 55. The UD fibres of the two fibre mats are spliced to each other via a preliminary connection, such as via an adhesive, stitching, or a frictional connection. The assembled fibre layer 52' is overall provided in dry form, i.e. non-impregnated, and it is important that the splicing or preliminary connection does not impair a later resin infusion process. Accordingly, the preliminary connection is only established so as to ensure that the UD fibres do not wrinkle and that the two fibre mats 54, 55 do not move during the layup or the later vacuum bagging and infusion process. In order to provide a relative long common boundary 56 and a smooth transition between the UD fibres of the two fibre mats 54, 55, the thickness to length ratio is between 1:50 and 1:5, advantageously around 1:30.

Figure 6:
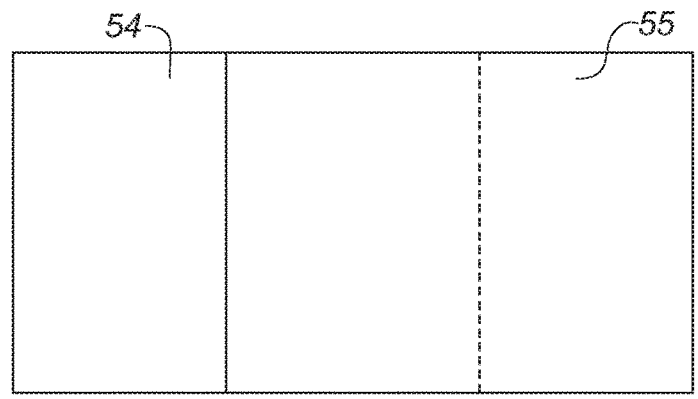
FIG. 6 is a schematic top view of a first assembled fibre layer according to the invention.

FIG. 6 illustrates a top view of a first embodiment of an assembled layer 52' according to the invention. The UD fibres are cut orthogonal to the longitudinal direction of the assembled layer 52', and the ends are cut taperingly so that a tapering transition between the UD fibres of the two mats 54, 55 are formed in the longitudinal direction of the assembled layer.

Figure 7:
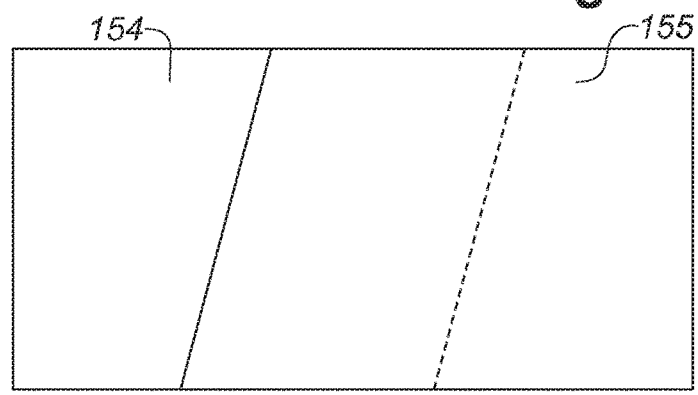
FIG. 7 is a schematic top view of a second assembled fibre layer according to the invention.

FIG. 7 illustrates a top view of a second embodiment of an assembled layer according to the invention, where UD fibres of a first fibre mat 154 are spliced with UD fibres of a second fibre mat 155. The UD fibres are cut so that the end face is angled compared to the transverse direction of the assembled fibre mat. The angle may for instance be approximately 10 degrees to the transverse direction or equivalently 80 degrees to the longitudinal direction. The ends are further cut so that a tapering transition between the UD fibres of the two mats 154, 155 are formed in the longitudinal direction of the assembled fibre layer.

Figure 8:
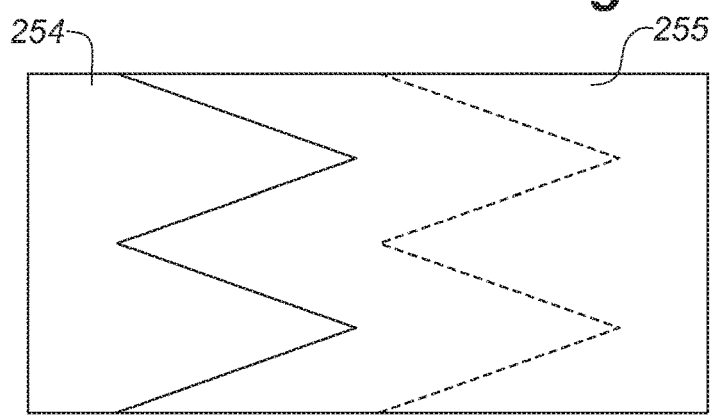
FIG. 8 is a schematic top view of a third assembled fibre layer according to the invention.

FIG. 8 illustrates a top view of a third embodiment of an assembled layer according to the invention, where UD fibres of a first fibre mat 254 are spliced with UD fibres of a second fibre mat 255. The UD fibres are cut so that the ends face in the transverse direction forming a zigzag pattern. The ends are further cut so that a tapering transition between the UD fibres of the two mats 254, 255 is formed in the longitudinal direction of the assembled fibre layer.

It should be mentioned that it is possible to combine the various embodiments for the cutting angle. It is for instance possible to provide a combination of the embodiments shown in FIGS. 7 and 8 by having a zigzag pattern along an inclined angle. Such an embodiment may distribute any possible small variations over a longer longitudinal distance of the fibre mats.

Figure 9:
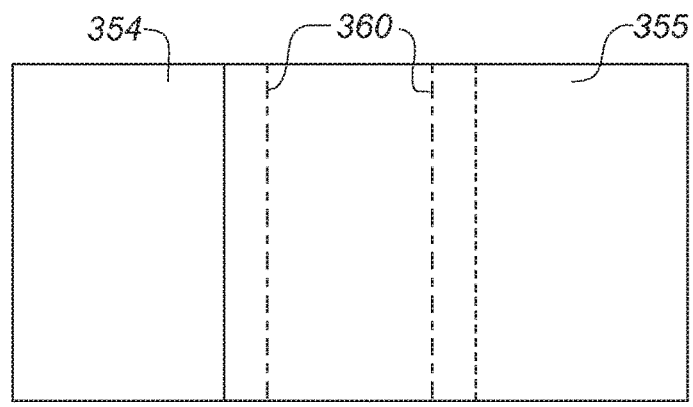
FIG. 9 is a schematic top view of a fourth assembled fibre layer according to the invention.

FIG. 9 illustrates a top view of a fourth embodiment of an assembled layer according to the invention, where UD fibres of a first fibre mat 354 are spliced with UD fibres of a second fibre mat 355. The UD fibres of the first fibre mat 354 and the UD fibres of the second fibre mat 355 are shown cut taperingly such that the UD fibres of the two fibre mats 354, 355 adjoin each other at a common boundary, which forms a tapering transition between the UD fibres of the two mats 354, 355 in the longitudinal direction. The splicing is in this embodiment facilitated by a double stitching 360.

Figure 10:
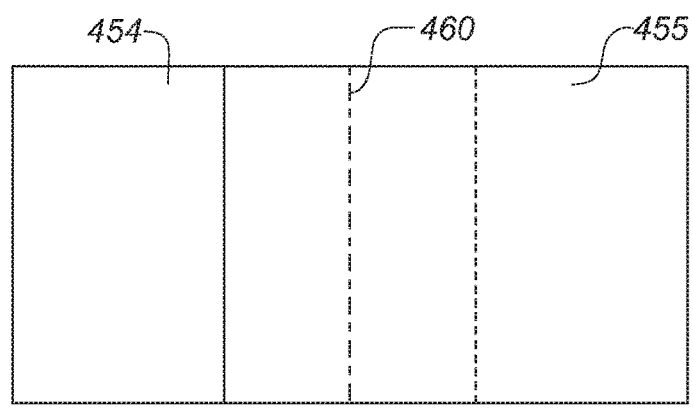
FIG. 10 is a schematic top view of a fifth assembled fibre layer according to the invention.

FIG. 10 illustrates a top view of a fifth embodiment of an assembled layer according to the invention, where UD fibres of a first fibre mat 454 are spliced with UD fibres of a second fibre mat 455. The UD fibres of the first fibre mat 454 and the UD fibres of the second fibre mat 455 are shown cut taperingly such that the UD fibres of the two fibre mats 454, 455 adjoin each other at a common boundary, which forms a tapering transition between the UD fibres of the two mats 454, 455 in the longitudinal direction. The splicing is in this embodiment facilitated by a single stitching line 460.

Figure 11:
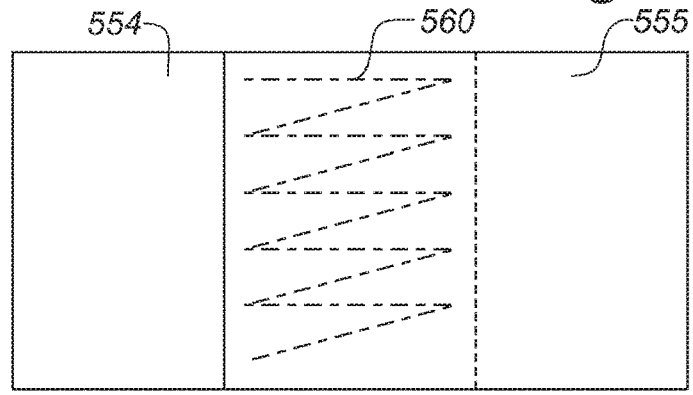
FIG. 11 is a schematic top view of a sixth assembled fibre layer according to the invention.

FIG. 11 illustrates a top view of a sixth embodiment of an assembled layer according to the invention, where UD fibres of a first fibre mat 554 are spliced with UD fibres of a second fibre mat 555. The UD fibres of the first fibre mat 554 and the UD fibres of the second fibre mat 555 are shown cut taperingly such that the UD fibres of the two fibre mats 554, 555 adjoin each other at a common boundary, which forms a tapering transition between the UD fibres of the two mats 554, 555 in the longitudinal direction. The splicing is in this embodiment facilitated by a zigzag stitch 560.

While the embodiments are shown as the preferred embodiment with a tapering transition between, it is recognised that the common boundary does not necessarily have to be tapered. However, in general the UD fibres of the two mats should overlap in the longitudinal direction such that the splicing may be achieved.

Further, it is recognised that it is possible to combine the stitching methods shown in FIGS. 9-11, e.g. by combining the zigzag stitch with the single stitch or double stitch.

Figure 12:
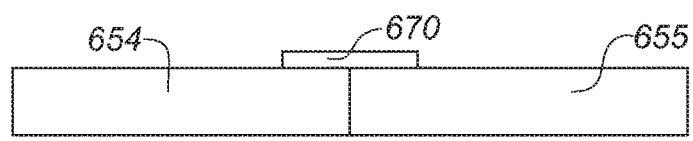
FIG. 12 is a schematic side view of a seventh assembled fibre layer according to the invention.

However, it is also possible to achieve a splicing of the fibres via a butt joint like boundary between the UD fibres of the two fibre mats as shown in FIG. 12. In this embodiment, the UD fibres of a first fibre mat 654 are spliced with UD fibres of a second fibre mat 655 via a scrim 670. The scrim may for instance be a glass tape or a chopped strand mat. The scrim may be connected to the two fibre mats via stitching, a frictional connection, an adhesive or a combination of these.

Figure 13:
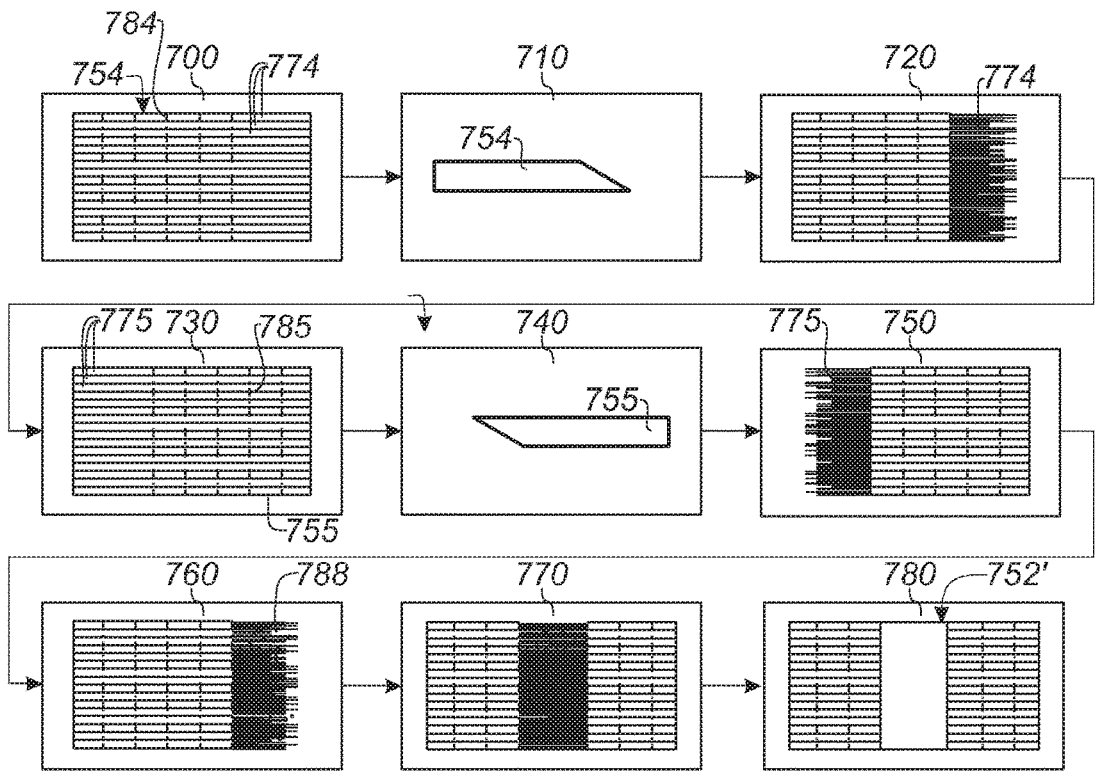
FIG. 13 is a flow chart showing an example of steps for producing an assembled fibre layer according to the invention.

FIG. 13 shows one example of the steps involved in producing an assembled fibre layer 752' according to the invention. In a first step 700, a first fibre mat 754 comprising bundles of UD fibres 774, which are stitched 784 in the transverse direction, is unstitched in an end region of the first fibre mat 754. The longitudinal extent of the region being unstitched may for instance be approximately 10 cm. In a second step 710, the end of the first fibre layer 754 is cut taperingly. In a third step, the UD fibres are combed and aligned such that it is ensured that the strands extend in the longitudinal direction.

In a fourth step 730, a second fibre mat 755 comprising bundles of UD fibres 775, which are stitched 785 in the transverse direction, is unstitched in an end region of the second fibre mat 755. The longitudinal extent of the region being unstitched may for instance be approximately 10 cm. In a fifth step 740, the end of the second fibre layer 755 is cut taperingly. In a sixth step, the UD fibres are combed and aligned such that it is ensured that the strands extend in the longitudinal direction.

In a seventh step 760, a Neoxil® powder 788 is applied to the unstitched UD fibres of the first fibre mat 754. The second fibre mat 755 is then in an eighth step 770 arranged so that the unstitched UD fibres of the second fibre mat 755 overlap with the unstitched UD fibres of the first fibre mat 754. In a ninth step 780, the unstitched overlapping UD fibres are heated and ironed such that the Neoxil® powder melts and provides a splicing between the UD fibres of the two mats 754, 755 and the assembled fibre layer 752' is formed.

While the method of producing the assembled fibre layer according to the invention is shown for the splicing being carried out via the use of an adhesive powder, it is recognised that the splicing steps can also be carried out via other adhesives, stitching, frictional connection or a combination thereof.

Figures 14, 15:
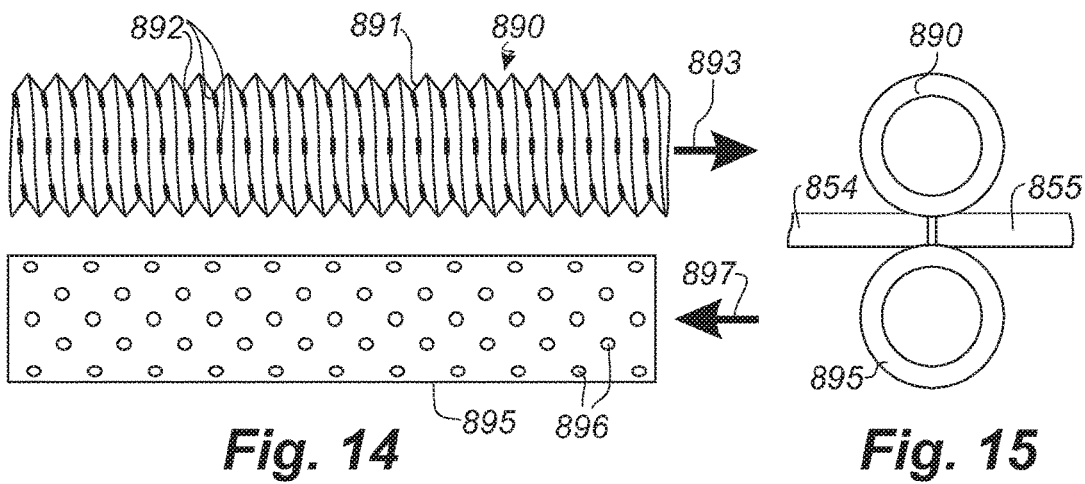
FIG. 14 shows a schematic view of rollers for use in the invention.
FIG. 15 shows a schematic side view of the rollers.

FIG. 14 shows a schematic front view and FIG. 15 shows a schematic side view of a roller system, which can be used to provide a frictional connection between UD fibres of a first fibre mat 854 and a second fibre mat 855. The roller system comprises a first roller 890 and a second roller 895. The first roller 890 has a corrugated surface with a number of ridges 891. The first roller is hollow and comprises a number of holes 892 in the surface. The second roller is also hollow and comprises a number of holes 896 in the surface. The roller system makes it possible to apply pressurised air to an inlet 897 of the second roller and apply suction 893 to the hollow interior of the first roller. The emission of air through the holes 896 of the second roller 895 creates loose fibre strands to the unstitched UD fibres, whereas the suction through the holes 892 ensures that the strands are aligned in the ridges 891 of the first roller 890. The distance between the two rollers 890 is set according to the thickness of the fibre mats 854, 855. The width and depth of the ridges 891 of the first roller 890 are set according to the desired cross-sectional UD fibre bundle size. The rollers 890 and 895 are rolled along the UD fibres of the two fibre mats 854, 855 in the longitudinal direction and may be rolled back and forth for a predetermined time or until a sufficient frictional connection is achieved.

The invention has been described with reference to advantageous embodiments. However, the scope of the invention is not limited to the illustrated embodiments, and alterations and modifications can be carried out without deviating from the scope of the invention.

| List of reference numerals | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 30 | root region |
| 32 | transition region |
| 34 | airfoil region |
| 36 | pressure side shell part |
| 38 | suction side shell part |
| 40 | shoulder |
| 50 | spar cap/main laminate |
| 52 | fibre layers |
| 52' | assembled fibre layer |
| 54, 154, 254, 354, 454, 554, 654, 754, 854 | first fibre mat |
| 55, 155, 255, 355, 455, 555, 655, 755, 855 | second fibre mat |
| 56 | common boundary |
| 360, 460, 560 | stitches |
| 670 | scrim |
| 700, 710, 720, 730, 740, 750, 760, 770, 780 | steps |
| 774, 775 | unidirectional fibres |
| 784, 785 | stitches |
| 788 | powder adhesive |
| 890 | first roller |
| 891 | ridges |
| 892 | holes |
| 893 | suction |
| 895 | second roller |
| 896 | holes |
| 897 | inlet |
| r | local radius, radial distance from blade root |
| L | blade length |

The invention claimed is:

1. A method of manufacturing a wind turbine blade part producing a single assembled longitudinally extending fibre layer for use in a later resin infusion process, the method comprising the following steps:
    a) providing a first fibre mat comprising unidirectional reinforcement fibres oriented in a longitudinal direction of the first fibre mat between two ends;
    b) providing a second fibre mat comprising unidirectional reinforcement fibres oriented in a longitudinal direction of the second fibre mat between two ends;
    c) arranging the first fibre mat and the second fibre mat so that unidirectional fibres of one end of the first fibre mat adjoin one end of the second fibre mat in a single plane at a common boundary; and
    d) splicing unidirectional fibres of the first fibre mat at said one end of the first fibre mat to unidirectional fibres of the second fibre mat at said one end of the second fibre mat in order to form a splicing joint, the first fibre mat and the second fibre mat forming a spliced mat, the spliced mat consisting of a single layer of longitudinally extending fibres.

2. The method according to claim 1, wherein said one end of the first fibre layer and said one end of the second fibre layer are cut taperingly, and wherein said fibre layers in step c) are arranged so that the common boundary forms a tapering transition between unidirectional fibres of the first fibre mat and unidirectional fibres of the second fibre mat in the longitudinal direction of the single continuous, longitudinally extending fibre layer.

3. The method according to claim 2, wherein the tapering transition has a thickness-to-length ratio between 1:50 and 1:5.

4. The method according to claim 1, wherein step d) comprises the use of an adhesive for providing said splicing.

5. The method according to claim 4, wherein the adhesive is powder based.

6. The method according to claim 1, wherein the splicing joint is heated.

7. The method according to claim 1, wherein step d) comprises the step of stitching the first fibre mat and the second fibre mat together for providing said splicing.

8. The method according to claim 1, wherein further unidirectional fibres of the first fibre mat are pressed against unidirectional fibres of the second fibre mat in order to form a frictional connection between said unidirectional fibres.

9. The method according to claim 1, wherein step d) comprises the use of rollers for pressing the unidirectional fibres of the first mat and the second fibre mat against each other.

10. The method according to claim 1, wherein unidirectional fibres at said one ends of the first fibre mat and the second fibre mat are unstitched at a longitudinal zone at said one ends prior to step d).

11. The method according to claim 1, wherein unidirectional fibres at said one ends of the first fibre mat and the second fibre mat are aligned in the longitudinal direction via alignment means.

12. A method of manufacturing a wind turbine blade part, comprising the steps of:

laying up fibre layers in a mould, wherein at least one of the fibre layers is produced according to the method of claim 1;

supplying a resin to said fibre layers; and forming the fibre layers into a composite structure.

13. The method of manufacturing a wind turbine blade part according to claim 12, wherein the layup of the fibre layers involves stacking a plurality of the fibre layers, and wherein said at least one fibre layer is sandwiched between two fibre layers which do not have a splicing joint at the splicing joint of said at least one fibre layer.

14. The method of manufacturing a wind turbine blade part according to claim 12, wherein the wind turbine blade part is a load carrying structure.

15. The method of manufacturing a wind turbine blade part according to claim 12, wherein the step of forming the fibre layers into the composite structure comprises formation selected from the group consisting of hardening and curing.

16. The method of manufacturing a wind turbine blade part according to claim 12, wherein the wind turbine blade part comprises a blade shell part.

17. The method according to claim 3, wherein the thickness-to-length ratio is approximately 1:30.

18. The method according to claim 6, wherein the splicing joint is ironed.

19. The method according to claim 11, wherein the alignment means comprise a comb.

* * * * *